(12) United States Patent
Chen et al.

(10) Patent No.: US 12,130,764 B2
(45) Date of Patent: Oct. 29, 2024

(54) CONTROL CIRCUIT OF BLIND-MATING DISPLAY HAVING TWO TYPE-C INTERFACES, CONTROL DEVICE THEREOF, AND CONTROL METHOD THEREOF

(71) Applicant: SHENZHEN XINLONGPENG TECHNOLOGY CO., LTD, Shenzhen (CN)

(72) Inventors: Jingsheng Chen, Shenzhen (CN); Mingliang Sun, Shenzhen (CN); Honghai Li, Shenzhen (CN); Liping He, Shenzhen (CN); Wenqing Xiao, Shenzhen (CN); Longhua Dai, Shenzhen (CN)

(73) Assignee: SHENZHEN XINLONGPENG TECHNOLOGY CO., LTD, Shenzhen (CN)

( * ) Notice: Subject to any disclaimer, the term of this patent is extended or adjusted under 35 U.S.C. 154(b) by 52 days.

(21) Appl. No.: 18/317,095

(22) Filed: May 15, 2023

(65) Prior Publication Data

US 2024/0028543 A1    Jan. 25, 2024

(30) Foreign Application Priority Data

Jul. 21, 2022   (CN) .......................... 202210880873.0

(51) Int. Cl.
| | |
|---|---|
| *G06F 13/40* | (2006.01) |
| *G06F 1/26* | (2006.01) |
| *G06F 3/14* | (2006.01) |
| *G06F 13/42* | (2006.01) |

(52) U.S. Cl.
CPC .......... *G06F 13/4022* (2013.01); *G06F 1/266* (2013.01); *G06F 3/14* (2013.01); *G06F 13/4282* (2013.01); *G06F 2213/0042* (2013.01)

(58) Field of Classification Search
CPC ....................................................... G06N 20/00
See application file for complete search history.

(56) References Cited

FOREIGN PATENT DOCUMENTS

| | | |
|---|---|---|
| CN | 211719243 U | 10/2020 |
| CN | 114201430 A | 3/2022 |
| CN | 114490496 A | 5/2022 |
| CN | 217116237 U | 8/2022 |
| CN | 115132117 A | 9/2022 |
| CN | 217690046 U | 10/2022 |

*Primary Examiner* — Henry Tsai
*Assistant Examiner* — Juanito C Borromeo

(57) ABSTRACT

The present disclosure provides a control circuit of a blind-mating display having two Type-C interfaces, a control device thereof, and a control method thereof. The control circuit of the blind-mating display having two Type-C interfaces includes a display control module, a first Type-C interface module, a second Type-C interface module, a first switching switch module, a second switching switch module, and a dielectric module. The dielectric module is electrically connected to the first Type-C interface module, the second Type-C interface module, and the display control module. The first switching switch module is electrically connected to the first Type-C interface module, the second Type-C interface module, and the display control module. The second switching switch module is electrically connected to the first Type-C interface module, the second Type-C interface module, and the display control module. The present disclosure is alternately communicated with the source device and the PD device.

10 Claims, 7 Drawing Sheets

CONTROL CIRCUIT OF BLIND-MATING DISPLAY HAVING TWO TYPE-C INTERFACES, CONTROL DEVICE THEREOF, AND CONTROL METHOD THEREOF

TECHNICAL FIELD

The present disclosure relates to a technical field of display control technology, and in particular to a control circuit of a blind-mating display based on one differential pair of configuration channels (CCs) and having two Type-C interface modules, a control device thereof, and a control method thereof.

BACKGROUND

A Type-C interface is a mainstream form of USB interface, a full name of which is USB Type-C interface. The Type-C interface has a smaller size than a Type-A interface or a Type-B interface, and the Type-C interface can be applied to both a personal computer (notebook, a USB host) and an external device (a sub device, such as a cell phone). Because the Type-C interface supports high power (power), high resolution (display), and USB (up to USB 3.2 Gen 2), the Type-C interface has become the dominant interface for monitors, computers, and other display terminals.

However, conventional blind-mating display having two blind-mating interfaces in the prior art requires two differential pairs of CCs and a power management chip (PMIC) to achieve bidirectional communication between a PD device and a display device. Thus, a circuit structure of the conventional blind-mating display device having two blind-mating interfaces is complex and hardware cost is high. Therefore, how to provide a reliable and low-cost control circuit of a blind-mating display having two blind-mating interfaces and base on one differential pair of configuration channels is an urgent problem for those skilled in the art.

SUMMARY

A purpose of the present disclosure provides a control circuit of a blind-mating display based on one differential pair of configuration channels (CCs) and having two Type-C interfaces, a control device thereof, and a control method thereof. In the present disclosure, when both of a first Type-C interface module and a second Type-C interface module are inserted into devices, and the devices are respectively a source device and a power delivery (PD) device, the first switching switch module is configured to switch a display control module to connect to configuration channel (CC) communication lines of the first Type-C interface module or CC communication lines of the second Type-C interface module, so as to realize time-sharing communication between the display control module and the source device or time-sharing communication between the display control module and the PD device. Alternatively, the first switching switch module and the second switching switch module switch the display control module to connect with the CC communication lines of the first Type-C interface module or the CC communication lines of the second Type-C interface module, so the PD device is communicated with the source device and the PD device is able to quickly charge the information device.

To solve the above problems, the present disclosure provides the control circuit of the blind-mating display having two Type-C interfaces and based on one differential pair of configuration channels. The control circuit of the blind-mating display having two Type-C interfaces comprises a display control module, a first Type-C interface module, a second Type-C interface module, a first switching switch module, a second switching switch module, and a dielectric module.

The dielectric module is electrically connected to the first Type-C interface module and the second Type-C interface module. The display control module is electrically connected to the dielectric module. The first switching switch module is electrically connected to the first Type-C interface module and the second Type-C interface module. The display control module is electrically connected to the first switching switch module. The second switching switch module is electrically connected to the first Type-C interface module and the second Type-C interface module. The display control module is electrically connected to the second switching switch module. The display control module is connected to a display terminal.

Devices are inserted into both of the first Type-C interface module and the second Type-C interface module, and the devices are respectively a source device and a power delivery (PD) device, the dielectric module is configured to transmit a source device insertion signal and a PD device insertion signal to the display control module.

The first switching switch module is configured to switch the display control module to connect to CC communication lines of the first Type-C interface module or CC communication lines of the second Type-C interface module, so as to realize time-sharing communication between the display control module and the source device or time-sharing communication between the display control module and the PD device.

Alternatively, the display control module is configured to control CC communication lines of the first switching switch module to connect to the first Type-C interface module inserted into the source device or the second Type-C interface module inserted into the source device. The display control module is configured to connect the dielectric module to the second Type-C interface module inserted into the PD device or the first Type-C interface module inserted into the PD device, so charging gear information of the PD device is sent to the source device.

The display control module is configured to control the CC communication lines of the first switching switch module to connect to the first Type-C interface module inserted into the PD device or the second Type-C interface module inserted into the PD device, and the display control module is configured to switch the second switching switch module to connect to the second Type-C interface module or the first Type-C interface module that is inserted into the source device, so a charging gear request of the source device is sent to the PD device.

The display control module is configured to control the PD device to communicate with a power supply of the source device. The display control module is configured to realize rapid charging control of the PD device to the source device.

Optionally, when one of the first Type-C interface module and the second Type-C interface module is inserted into the source device, the dielectric module is configured to transmit the source device insertion signal to the display control module. The display control module is configured to control the CC communication lines of the first switching switch module to connect to the first Type-C interface module or the second Type-C interface module inserted into the source device. The source device inputs a display signal source to the display control module through the first Type-C interface module or the second Type-C interface module to realize output display.

Optionally, when one of the first Type-C interface module and the second Type-C interface module is inserted into the PD device. The dielectric module is configured to transmit the PD device insertion signal to the display control module. The display control module is configured to control the CC communication lines of the first switching switch module to connect to the first Type-C interface module or the second Type-C interface module inserted into the PD device. The display control module performs protocol communication with the PD device through the first Type-C interface module or the second Type-C interface module to realize rapid charging control of the display terminal.

Optionally, the control circuit of the blind-mating display having two Type-C interfaces further comprises a USB switching module and a USB extension module. The USB switching module is electrically connected to the first Type-C interface module and the second Type-C interface module. The USB extension module is electrically connected to the USB switching module.

Optionally, the dielectric module comprises a first dielectric unit and a second dielectric unit. The first dielectric unit is electrically connected to the first Type-C interface module, the display control module, and a system power supply. The second dielectric unit is electrically connected to the second Type-C interface module, the display control module, and the system power supply. Optionally, the first dielectric unit comprises a first positive channel metal oxide semiconductor (PMOS) transistor, a first triode, and a second triode.

A gate of the first PMOS transistor is electrically connected to the display control module. A source of the first PMOS transistor is electrically connected to the system power supply. A drain of the first PMOS transistor is electrically connected to a base of the first triode. An emitter of the first triode is electrically connected to a first CC pin of the first Type-C interface module. A collector of the first triode is grounded. A base of the second triode is electrically connected to the base of the first triode. An emitter of the second triode is electrically connected to a second CC pin of the first Type-C interface module. A collector of the second triode is grounded.

Optionally, the first switching switch module comprises a first double-pole double-throw analog switching switch, a first resistor, and a second resistor.

A first end of the first double-pole double-throw analog switching switch is electrically connected to a first end of the display control module and a first end of the first resistor. A second end of the first resistor is electrically connected to a system power supply. A second end of the first double-pole double-throw analog switching switch is electrically connected to a first CC pin of the first Type-C interface module. A third end of the first double-pole double-throw analog switching switch is electrically connected to a first CC pin of the second Type-C interface module. A fourth end of the first double-pole double-throw analog switching switch is electrically connected to the display control module. A fifth end of the first double-pole double-throw analog switching switch is grounded. A sixth end of the first double-pole double-throw analog switching switch is electrically connected to the display control module. A seventh end of the first double-pole double-throw analog switching switch is electrically connected to a second CC pin of the second Type-C interface module. An eighth end of the first double-pole double-throw analog switching switch is electrically connected to a second CC pin of the first Type-C interface module. A ninth end of the first double-pole double-throw analog switching switch is electrically connected to the display control module and a first end of the second resistor, a second end of the second resistor is electrically connected to the system power supply. A tenth end of the first double-pole double-throw analog switching switch is electrically connected to the system power supply.

Optionally, the second switching switch module comprises a second double-pole double-throw analog switching switch, a third resistor, and a fourth resistor.

A first end of the second double-pole double-throw analog switching switch is electrically connected to the display control module, a second end of the second double-pole double-throw analog switching switch is electrically connected to a first CC pin of the first Type-C interface module. A third end of the second double-pole double-throw analog switching switch is electrically connected to a first CC pin of the second Type-C interface module. A fourth end of the second double-pole double-throw analog switching switch is electrically connected to a first end of the third resistor. A second end of the third resistor is electrically connected to a system power supply. A fifth end of the second double-pole double-throw analog switching switch is grounded. A sixth end of the second double-pole double-throw analog switching switch is electrically connected to a first end of the fourth resistor. A second end of the fourth resistor is electrically connected to the system power supply. A seventh end of the second double-pole double-throw analog switching switch is electrically connected to a second CC pin of the second Type-C interface module. A eighth end of the second double-pole double-throw analog switching switch is electrically connected to a second CC pin of the first Type-C interface module. A ninth end of the second double-pole double-throw analog switching switch is electrically connected to the display control module. A tenth end of the second double-pole double-throw analog switching switch is electrically connected to the system power supply.

To solve the above technical problems, the present disclosure provides a control device of the blind-mating display having two Type-C interfaces and based on one differential pair of CCs. The control device comprises the control circuit of the blind-mating display having two Type-C interfaces and based on one differential pair of CCs mentioned above.

To solve the above technical problems, the present disclosure provides a control method of the blind-mating display having two Type-C interfaces and based on one differential pair of CCs. The control method is applied to the control circuit of the blind-mating display having two Type-C interfaces and based on one differential pair of CCs mentioned above. The control method comprises:

controlling the dielectric module to transmit the source device insertion signal and the PD device insertion signal to the display control module, when both of the first Type-C interface module and the second Type-C interface module are inserted into the devices, and the devices are respectively the source device and the PD device, controlling the first switching switch module to switch the display control module to connect to the CC communication lines of the first Type-C interface module or the CC communication lines of the second Type-C interface module, so as to realize the time-sharing communication; or controlling the CC communication lines of the first switching switch module to connect to the first Type-C interface module or the second Type-C interface module inserted into the source device; and connecting the dielectric module to the second Type-C interface module or the first Type-C interface module inserted into the PD device, so the charging gear information provided by the PD device is sent to the source device;

controlling the CC communication lines of the first switching switch module to connect to the first Type-C interface module or the second Type-C interface module inserted into the PD device, and switching the second switching switch module to connect to the second Type-C interface module or the first Type-C interface module that is inserted into the source device, so the charging gear request of the source device is sent to the PD device; and controlling the PD device to communicate with the power supply of the source device; realizing rapid charging control of the PD device to the source device.

The control circuit of the blind-mating display having two Type-C interfaces has following characteristics. The control circuit of the blind-mating display having two Type-C interfaces comprises the display control module, the first Type-C interface module, the second Type-C interface module, the first switching switch module, the second switching switch module, and the dielectric module. The dielectric module is electrically connected to the first Type-C interface module and the second Type-C interface module. The display control module is electrically connected to the dielectric module. The first switching switch module is electrically connected to the first Type-C interface module and the second Type-C interface module. The display control module is electrically connected to the first switching switch module. The second switching switch module is electrically connected to the first Type-C interface module and the second Type-C interface module. The display control module is electrically connected to the second switching switch module. In the present disclosure, two communication lines of the display control module are connected with two communication lines of the first switching switch module. The two communication lines of the first switching switch module receive a control signal from the display control module and are alternately connected with two communication lines of the first Type-C interface module and two communication lines of the second Type-C interface module, so that the control circuit of the blind-mating display having two Type-C interfaces of the present disclosure realizes two-way communication with the source device and the PD device. Thus, the control circuit of the blind-mating display having two Type-C interfaces of the present disclosure is communicated with the source device and the PD device in a time-sharing manner through one differential pair of CCs, so that the source device or the display terminal is charged by the PD device without a power management integrated chip (PMIC), cost is low, and user experience is good.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor. In the drawing.

DETAILED DESCRIPTION

A purpose of the present disclosure provides a control circuit of a blind-mating display having two Type-C interfaces and based on one differential pair of configuration channels (CCs), a control device thereof, and a control method thereof. In the present disclosure, when both of a first Type-C interface module and a second Type-C interface module are inserted into devices, and the devices are respectively a source device and a power delivery (PD) device, the first switching switch module is configured to switch a display control module to connect to CC communication lines of the first Type-C interface module or CC communication lines of the second Type-C interface module, so as to realize time-sharing communication between the display control module and the source device or time-sharing communication between the display control module and the PD device. Alternatively, the first switching switch module and the second switching switch module switch the display control module to connect with the CC communication lines of the first Type-C interface module or the CC communication lines of the second Type-C interface module, so the PD device is communicated with the source device and the PD device is able to quickly charge the information device.

In order to make objectives, technical solutions, and advantages of the embodiments of the present disclosure clear, technical solutions in the embodiments of the present disclosure will be described clearly and completely in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

Figure 1:
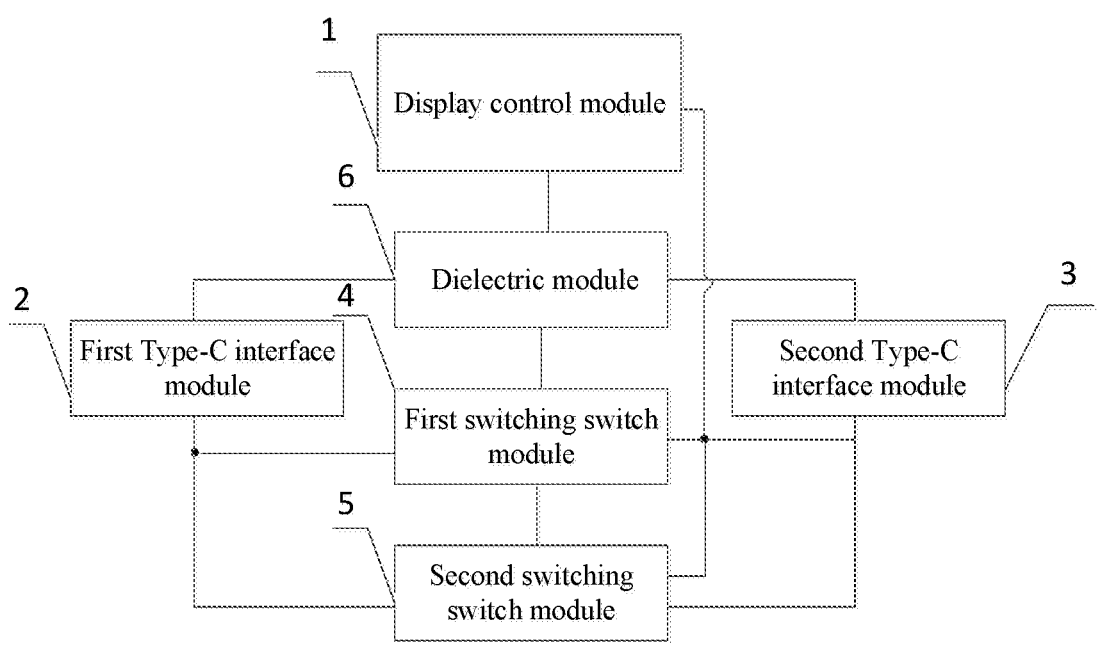
FIG. 1 is a schematic block diagram of a control circuit of a blind-mating display having two Type-C interfaces and based on one differential pair of configuration channels according to one optional embodiment of the present disclosure.

As shown in FIG. 1, FIG. 1 is a schematic block diagram of the control circuit of the blind-mating display having two Type-C interfaces and based on one differential pair of CCs of the present disclosure. The control circuit of the blind-mating display having two Type-C interfaces comprises a display control module 1, a first Type-C interface module 2, a second Type-C interface module 3, a first switching switch module 4, a second switching switch module 5, and a dielectric module 6.

The dielectric module 6 is electrically connected to the first Type-C interface module 2 and the second Type-C interface module 3. The display control module 1 is electrically connected to the dielectric module 6.

The first switching switch module 4 is electrically connected to the first Type-C interface module 2 and the second Type-C interface module 3. The display control module 1 is electrically connected to the first switching switch module 4.

The second switching switch module 5 is electrically connected to the first Type-C interface module 2 and the second Type-C interface module 3. The display control module 1 is electrically connected to the second switching switch module 5. The display control module 1 is connected to a display terminal.

Both of the first Type-C interface module 2 and the second Type-C interface module 3 are inserted into devices, and the devices are respectively a source device and a power delivery (PD) device, the dielectric module 6 is configured to transmit a source device insertion signal and a PD device insertion signal to the display control module 1.

The first switching switch module 4 is configured to switch the display control module 1 to connect to CC communication lines of the first Type-C interface module 2 or CC communication lines of the second Type-C interface module 3, so as to realize time-sharing communication between the display control module and the source device or time-sharing communication between the display control module and the PD device.

Alternatively, the display control module 1 is configured to control CC communication lines of the first switching switch module 4 to connect to the first Type-C interface module 2 or the second Type-C interface module 3 inserted into the source device. The display control module 1 is configured to connect the dielectric module 6 to the second Type-C interface module 3 or the first Type-C interface module 2 inserted into the PD device, so charging gear information of the PD device is sent to the source device.

The display control module 1 is configured to control the CC communication lines of the first switching switch module 4 to connect to the first Type-C interface module 2 or the second Type-C interface module 3 inserted into the PD device, and the display control module 1 is configured to switch the second switching switch module 5 to connect to the second Type-C interface module 3 or the first Type-C interface module 2 that is inserted into the source device, so a charging gear request of the source device is sent to the PD device.

The display control module 1 is configured to control the PD device to communicate with a power supply of the source device. The display control module 1 is configured to realize rapid charging control of the PD device to the source device.

In the prior art, two differential pairs of CCs are required for a conventional blind-mating display device having two blind-mating interfaces, and a power management integrated chip (PMIC) is required, so that bidirectional communication between the PD device and a display terminal is realized. However, a circuit structure of the conventional blind-mating display device having two blind-mating interfaces is complex and hardware cost is high.

In view of above-mentioned disadvantages, in the present disclosure, by cooperation of the display control module 1, the first Type-C interface module 2, the second Type-C interface module 3, the first switching switch module 4, the second switching switch module 5, and the dielectric module 6, the control circuit of the blind-mating display having two Type-C interfaces is communicated with the source device and the PD device in a time-sharing manner, so that the source device or the display terminal is charged by the PD device without the PMIC, cost of the present disclosure is low, and the user experience is good.

Specifically, when both of the first Type-C interface module 2 and the second Type-C interface module 3 are inserted into the device, that is, the first Type-C interface module 2 is inserted into the source device and the second Type-C interface module 3 is inserted into the PD device, or, the first Type-C interface module 2 is inserted into the PD device and the second Type-C interface module 3 is inserted into the source device. The dielectric module 6 sends the source device insertion signal and PD device insertion signal to the display control module 1 via external pull-down inducer to the display control module 1. It is understood that the first switching switch module 4 switches the display control module 1 to connect to the CC communication lines of the first Type-C interface module 2 or the CC communication lines of the second Type-C interface module 3. One of the source device and the PD device that is first docked with the control circuit of the blind-mating display completes communication first. When communication of one of the first Type-C interface module 2 and the second Type-C interface module 3 is completed, the first switching switch module switches the other one of the first Type-C interface module 2 and the second Type-C interface module 3 to complete communication, so as to realize time-sharing communication between the display control module and the source device or time-sharing communication between the display control module and the PD device.

Specifically, when the source device does not support a DRP mode, the display control module 1 receives a display signal input by the source device, processes the display signal, and then transmits a processed display signal to the display terminal for display. The PD device communicates with the display control module 1 to switch a power supply role, and the display terminal is switched to be powered from a sink end of the display terminal. Then, the charging gear information of the PD device is sent to the display terminal, and the display terminal sends the charging gear request of 5-20 V, so as to complete the power supply communication to realize the rapid charging control of the PD device to the display terminal.

Specifically, when the source device supports the DRP mode, the present disclosure controls the PD device to realize rapid charging control on the source device. For example, when the first Type-C interface module 2 is inserted into the source device and the second Type-C interface module 3 is inserted into the PD device, the display control module 1 controls the first switching switch module 4 to switch the CC communication lines to connect to the second Type-C interface module 3 that is inserted into the PD device, so the charging gear request of the source device is sent to the PD device. The display control module 1 then controls the first switching switch module 4 to switch the CC communication lines to connect to the first Type-C interface module 2 that is inserted into the source device, so as to send the charging gear information of the PD device to the source device. When the display control module 1 controls the first switching switch module 4 to switch the CC communication lines to connect to the first Type-C interface module 2 that is inserted into the source device, the dielectric module 6 is connected to the second Type-C interface module 3 inserted into the PD device. The display control module 1 controls the first switching switch module 4 to switch the CC communication lines to connect to the second Type-C interface module 3 that is inserted into the PD device, and switches the second switching switch module 5 to insert into the first Type-C interface module 2 that is inserted into the source device. The display control module 1 controls the PD device to communicate with the power supply of the source device and realizes rapid charging control of the PD device to the source device.

Specifically, in the embodiment, the first Type-C interface module 2 or the second Type-C interface module 3 determines whether an accessed device is the source device or the PD device by obtaining a voltage of a VBUS pin and video display metafile (VDM) information. If the voltage of the VBUS pin is greater than 4.3 V and the VDM information exists, it is determined that the accessed device is the source device. If the voltage of the VBUS pin is greater than 4.3 V and no VDM information exists, it is determined that the accessed device is the PD device.

In summary, the present disclosure provides the control circuit of the blind-mating display having two Type-C interfaces and based on one differential pair of CCs. The control circuit of the blind-mating display having two Type-C interfaces comprises the display control module 1, the first Type-C interface module 2, the second Type-C interface module 3, the first switching switch module 4, the second switching switch module 5, and the dielectric module 6.

when both of the first Type-C interface module 2 and the second Type-C interface module 3 are inserted into the devices, and the devices are respectively the source device and the PD device, the first switching switch module 4 is configured to switch the display control module to connect to the CC communication lines of the first Type-C interface module 2 or the CC communication lines of the second Type-C interface module 3, so as to realize the time-sharing communication. Alternatively, the first switching switch module and the second switching switch module switch the display control module to connect with the CC communication lines of the first Type-C interface module or the CC communication lines of the second Type-C interface module, so the PD device is communicated with the power supply of the source device and the PD device is able to quickly charge the information device. Therefore, the control circuit of the blind-mating display having two Type-C interfaces is communicated with the source device and the PD device is performed in the time-sharing manner, so that the source device or the display terminal is charged by the PD device without the PMIC, the cost is low, and the user experience is good.

Base on the embodiment mentioned above, in one optional embodiment, when one of the first Type-C interface module 2 and the second Type-C interface module 3 is inserted into the source device, the dielectric module 6 is configured to transmit the source device insertion signal to the display control module 1.

The display control module 1 is configured to control the CC communication lines of the first switching switch module 4 to connect to the first Type-C interface module 2 or the second Type-C interface module 3 inserted into the source device.

The source device inputs a display signal source to the display control module 1 through the first Type-C interface module 2 or the second Type-C interface module 3 to output display.

Specifically, when only one of the first Type-C interface module 2 and the second Type-C interface module 3 is inserted into the accessed device and the accessed device is the source device, the first switching switch module 4 switches the CC communication lines to connect to one of the first Type-C interface module 2 and the second Type-C interface module 3 that is inserted into the source device. The dielectric module 6 sends the source device insertion signal to the display control module 1 via the external pull-down inducer to the display control module 1. The display control module 1 processes the display signal and then transmits the processed display signal to the display terminal for display.

In one optional embodiment, when one of the first Type-C interface module 2 and the second Type-C interface module 3 is inserted into the PD device, the dielectric module 6 is configured to transmit the PD device insertion signal to the display control module 1. The display control module 1 is configured to control the CC communication lines of the first switching switch module 4 to connect to the first Type-C interface module 2 or the second Type-C interface module 3 that is inserted into the PD device. The display control module performs protocol communication with the PD device through the first Type-C interface module 2 or the second Type-C interface module 3 to realize the rapid charging control of the display terminal.

Specifically, when only one of the first Type-C interface module 2 and the second Type-C interface module 3 is inserted into the accessed device and the accessed device is the PD device, the first switching switch module 4 switches the CC communication lines to connect to the one of the first Type-C interface module 2 and the second Type-C interface module 3 that is inserted into the PD device.

The dielectric module 6 sends the PD device insertion signal to the display control module 1 via the external pull-down inducer to the display control module 1. At this time, the display terminal is configured as a sink end. The display control module 1 performs CC communication with the PD device via the first switching switch module 4. After completing the communication on a request charging gear, the PD device rapidly charges the display terminal.

Specifically, in the embodiment, a chip model of the display control module 1 is RTD2555T. In another optional embodiment, the chip model of the display control module 1 is not specifically limited.

Figure 2:
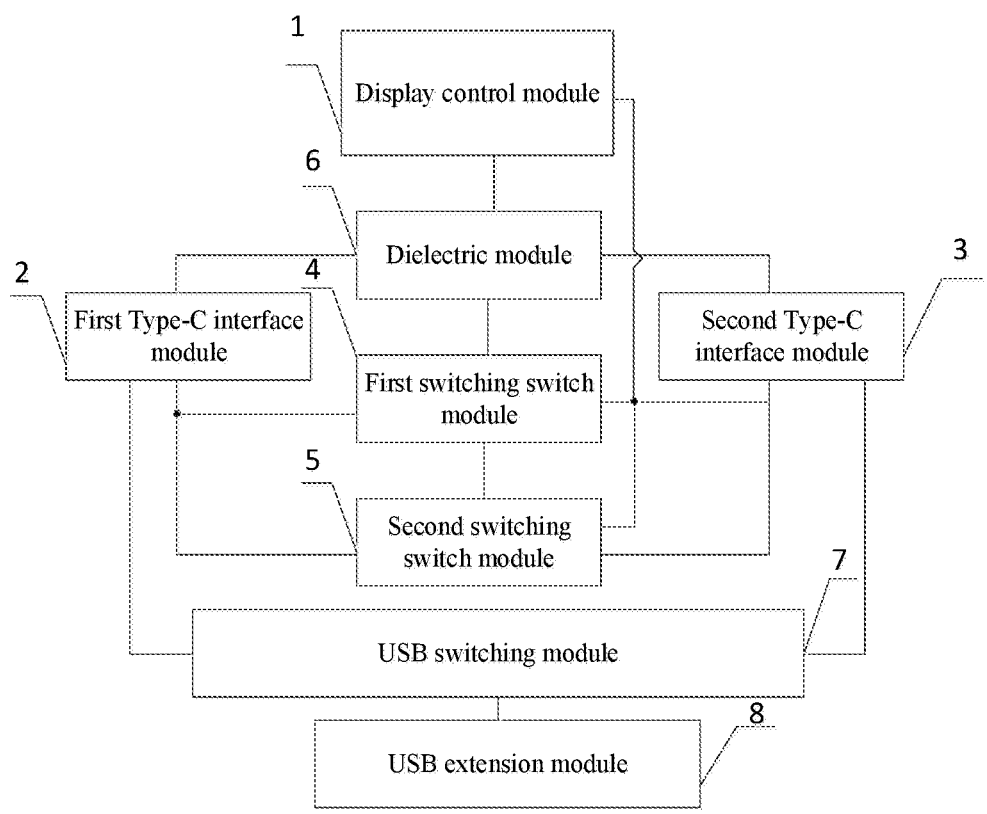
FIG. 2 is another schematic block diagram of the control circuit of the blind-mating display having two Type-C interfaces and based on one differential pair of CCs according to one optional embodiment of the present disclosure.

As shown in FIG. 2, FIG. 2 is another schematic block diagram of the control circuit of the blind-mating display having two Type-C interfaces and based on one differential pair of CCs of the present disclosure.

In one optional embodiment, the control circuit of the blind-mating display having two Type-C interfaces further comprises a USB switching module 7 and a USB extension module 8.

The USB switching module 7 is electrically connected to the first Type-C interface module 2 and the second Type-C interface module 3. The USB extension module 8 is electrically connected to the USB switching module 7.

Specifically, the USB extension module 8 is a USB hub, and the USB hub is configured to connect with a USB device to realized USB extension. It is understood that, in the embodiment, a first Type-C interface of the USB hub transmits a USB 3.2 Gen 2 signal to the display control module 1. The display control module 1 transmits a USB 2.0 signal through reversing the USB 3.2 Gen 2 signal. A second Type-C interface of the USB hub transmits USB 2.0 signals to the USB switching module 7. The USB switching module 7 is configured to switch a direction of the USB signals.

In one optional embodiment, the dielectric module 6 comprises a first dielectric unit 61 and a second dielectric unit 62.

The first dielectric unit 61 is electrically connected to the first Type-C interface module 2, the display control module 1, and a system power supply.

The second dielectric unit 62 is electrically connected to the second Type-C interface module 3, the display control module 1, and the system power supply.

Specifically, when the first Type-C interface module 2 is inserted into the PD device and the second Type-C interface module 3 is inserted into the source device, the first power inducing unit 61 is configured to access the PD device in the first Type-C interface module 2 to obtain a voltage signal of the 5 V power supply of the PD device, and the second power inducing unit 62 is configured to detect whether the source device is connected and is configured to obtain a voltage signal of the 5 V power supply of the source device.

Figure 3:
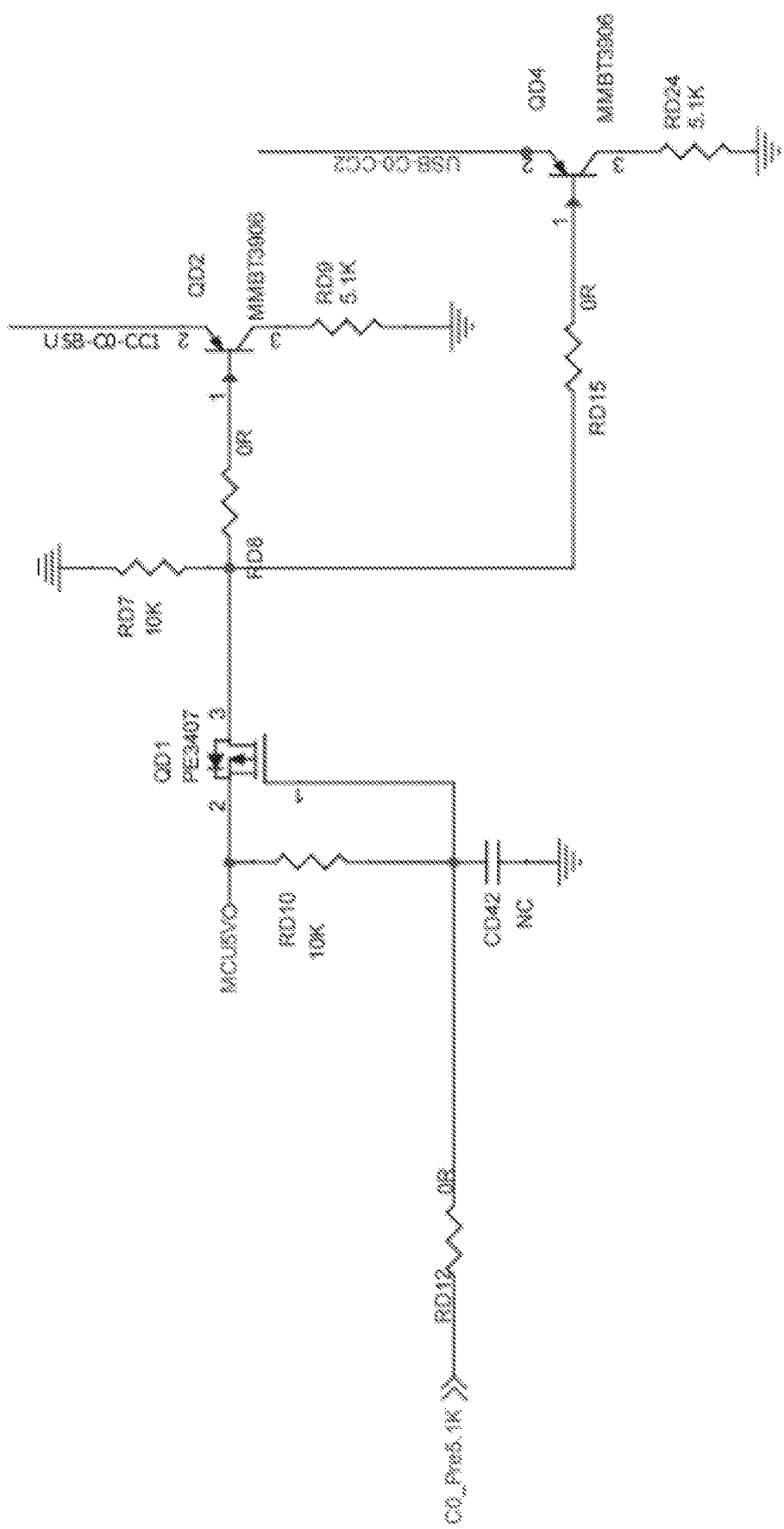
FIG. 3 is a circuit schematic diagram of a first dielectric unit according to one optional embodiment of the present disclosure.

As shown in FIG. 3, FIG. 3 is a circuit schematic diagram of the first dielectric unit 61 of the present disclosure.

Figure 4:
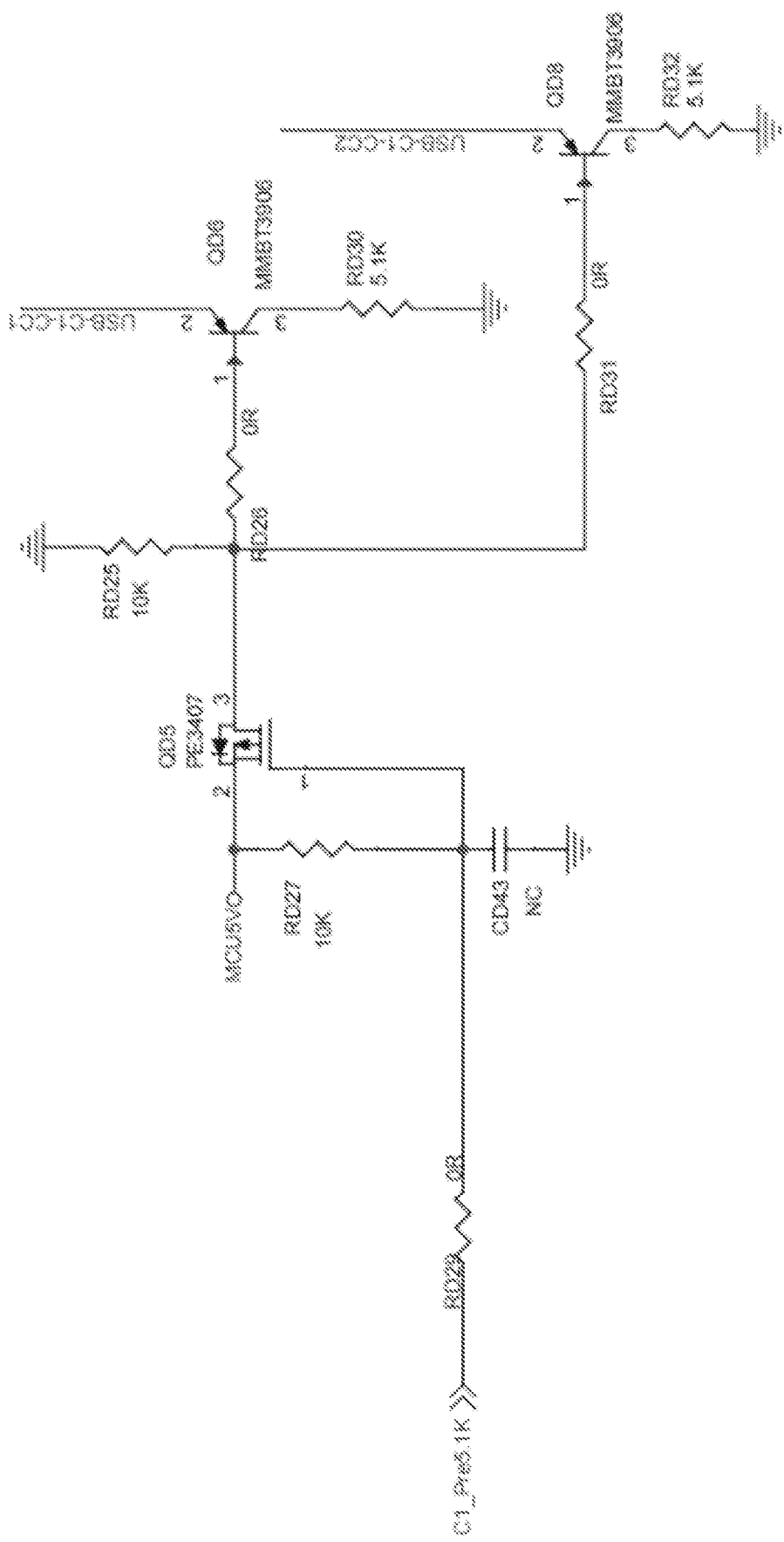
FIG. 4 is a circuit schematic diagram of a second dielectric unit according to one optional embodiment of the present disclosure.

As shown in FIG. 4, FIG. 4 is a circuit schematic diagram of the second dielectric unit 62 of the present disclosure.

In one optional embodiment, the first dielectric unit 61 comprises a first positive channel metal oxide semiconductor (PMOS) transistor, a first triode QD2, and a second triode QD4.

A gate of the first PMOS transistor QD1 is electrically connected to the display control module 1. A source of the first PMOS transistor QD1 is electrically connected to the system power supply. A drain of the first PMOS transistor QD1 is electrically connected to a base of the first triode QD2. An emitter of the first triode QD2 is electrically connected to a first CC pin of the first Type-C interface module 2. A collector of the first triode QD2 is grounded. A base of the second triode QD4 is electrically connected to the base of the first triode QD2. An emitter of the second triode QD4 is electrically connected to a second CC pin of the first Type-C interface module 2. A collector of the second triode QD4 is grounded.

Specifically, when the PD device is connected, the first triode QD2 or the second triode QD4 is turned on, the CC pin of the first Type-C interface module 2 is pulled down, and the display control module 1 is initialized to turn on the first PMOS transistor QD1. The display control module 1 is communicated with the PD device and is communicate with the power supply.

Specifically, when a printed circuit board where the control circuit of the blind-mating display is located is out of power, a resistor RD7 is configured to realize conduction of the first triode QD2. A resistor RD10 is configured as an external pull-up resistor of the pin of the display control module 1. A resistor RD9 and A resistor RD24 are configured as pull-down resistors of the first Type-C interface module 2. The first dielectric unit 61 further includes a resistor RD8, a resistor RD15, and a resistor RD12. The resistor RD8 and the resistor RD15 are respectively a base resistor of the first triode QD2 and a base resistor of the second triode QD4. A resistor RD12 is a test divider resistor. It is understood that in the embodiment, a resistance of the resistor RD9 is 5.1 K and a resistance of the resistor RD24 is 5.1 K.

Specifically, circuit structure and principle of the second dielectric unit 62 is same as that circuit structure and principle of the first dielectric unit 61, which is not repeated herein.

Specifically, when the source device is connected, the third triode QD6 or the fourth triode QD8 is turned on, the CC pin of the second Type-C interface module 3 is pulled down, the display control module 1 is initialized to turn on the first PMOS transistor QD1, and the display control module 1 is communicated with the source device, and abstract the power supply of the source device.

Figure 5:
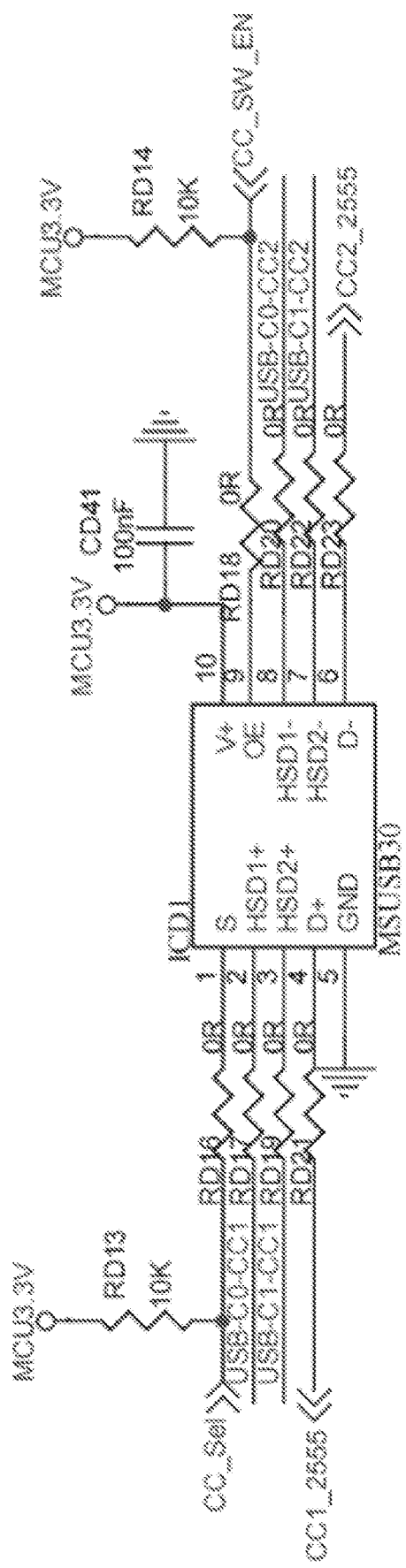
FIG. 5 is a circuit schematic diagram of a first switching switch module according to one optional embodiment of the present disclosure.
Figure 6:
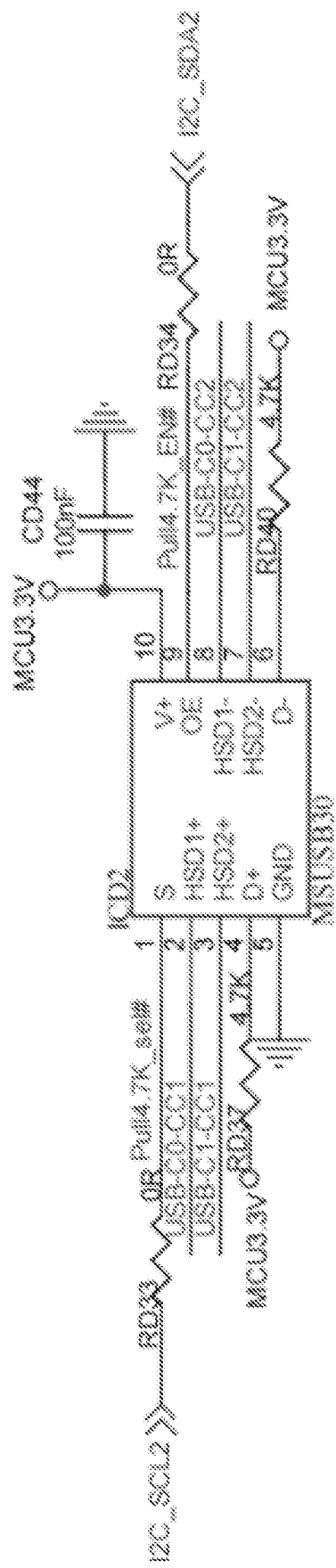
FIG. 6 is a circuit schematic diagram of a second switching switch module according to one optional embodiment of the present disclosure.

As shown in FIG. 5, FIG. 5 is a circuit schematic diagram of a first switching switch module 4 according to one optional embodiment of the present disclosure.

In one optional embodiment, the first switching switch module 4 comprises a first double-pole double-throw analog switching switch ICD1, a first resistor RD13, and a second resistor RD14.

A first end of the first double-pole double-throw analog switching switch ICD1 is electrically connected to a first end of the display control module 1 and a first end of the first resistor RD13. A second end of the first resistor RD13 is electrically connected to a system power supply. A second end of the first double-pole double-throw analog switching switch ICD1 is electrically connected to a first CC pin of the first Type-C interface module 2. A third end of the first double-pole double-throw analog switching switch ICD1 is electrically connected to a first CC pin of the second Type-C interface module 3. A fourth end of the first double-pole double-throw analog switching switch ICD1 is electrically connected to the display control module 1. A fifth end of the first double-pole double-throw analog switching switch ICD1 is grounded. A sixth end of the first double-pole double-throw analog switching switch ICD1 is electrically connected to the display control module 1. A seventh end of the first double-pole double-throw analog switching switch ICD1 is electrically connected to a second CC pin of the second Type-C interface module 3. An eighth end of the first double-pole double-throw analog switching switch ICD1 is electrically connected to a second CC pin of the first Type-C interface module 2. A ninth end of the first double-pole double-throw analog switching switch ICD1 is electrically connected to the display control module 1 and a first end of the second resistor RD14, a second end of the second resistor RD14 is electrically connected to the system power supply. A tenth end of the first double-pole double-throw analog switching switch ICD1 is electrically connected to the system power supply.

In one optional embodiment, the second switching switch module 5 comprises a second double-pole double-throw analog switching switch ICD2, a third resistor RD37, and a fourth resistor RD40.

A first end of the second double-pole double-throw analog switching switch ICD2 is electrically connected to the display control module 1. A second end of the second double-pole double-throw analog switching switch ICD2 is electrically connected to a first CC pin of the first Type-C interface module 2. A third end of the second double-pole double-throw analog switching switch ICD2 is electrically connected to a first CC pin of the second Type-C interface module 3. A fourth end of the second double-pole double-throw analog switching switch ICD2 is electrically connected to a first end of the third resistor RD37. A second end of the third resistor RD37 is electrically connected to a system power supply. A fifth end of the second double-pole double-throw analog switching switch ICD2 is grounded. A sixth end of the second double-pole double-throw analog switching switch ICD2 is electrically connected to a first end of the fourth resistor RD40. A second end of the fourth resistor RD40 is electrically connected to the system power supply. A seventh end of the second double-pole double-throw analog switching switch ICD2 is electrically connected to a second CC pin of the second Type-C interface module 3. A eighth end of the second double-pole double-throw analog switching switch ICD2 is electrically connected to a second CC pin of the first Type-C interface module 2. A ninth end of the second double-pole double-throw analog switching switch ICD2 is electrically connected to the display control module 1. A tenth end of the second double-pole double-throw analog switching switch ICD2 is electrically connected to the system power supply.

Specifically, in the embodiment, the third resistor RD37 and the fourth resistor RD40 are pull-up resistors of the second double-pole double-throw analog switching switch ICD2 with a resistance of 4.7 K. It is understood that the resistance of the third resistor RD37 and the resistance of the fourth resistor RD40 are set according to an output current capability of the PD device and are not specifically limited herein.

Specifically, when the source device supports the DRP mode, the PD device is controlled to realize rapid charging control on the source device. When the first Type-C interface module 2 is inserted into the PD device and the second Type-C interface module 3 is inserted into the source device, after the first switching switch module 4 is switched to a request power gear of the source device, the display control module 1 is switched to a SRC mode, and the display control module 1 switches the second switching switch module 5 to the CC communication of the source device, so that the source device is communicated with the display control module 1.

The display control module 1 switches the first switching switch module 4 to connect to the PD device. The display control module 1 is communicated with the PD device through the CC communication lines of the display control module 1 and the pull-down resistor thereof. After the display control module 1 is communicated with the PD device, the charging gear request of the source device is sent to the PD device, and after the PD device receives the charging gear request, the display control module 1 connects the dielectric module 6 to the first Type-C interface module 2 that is inserted into the PD device. The display control module 1 is connected to the source device again through the first switching switch module 4 to inform the source device PS_RDY, thereby completing power communication between the PD device and the source device.

The present disclosure provides a control device of the blind-mating display having two Type-C interfaces and based on one differential pair of CCs. The control device comprises the control circuit of the blind-mating display having two Type-C interfaces and based on one differential pair of CCs mentioned above.

Figure 7:
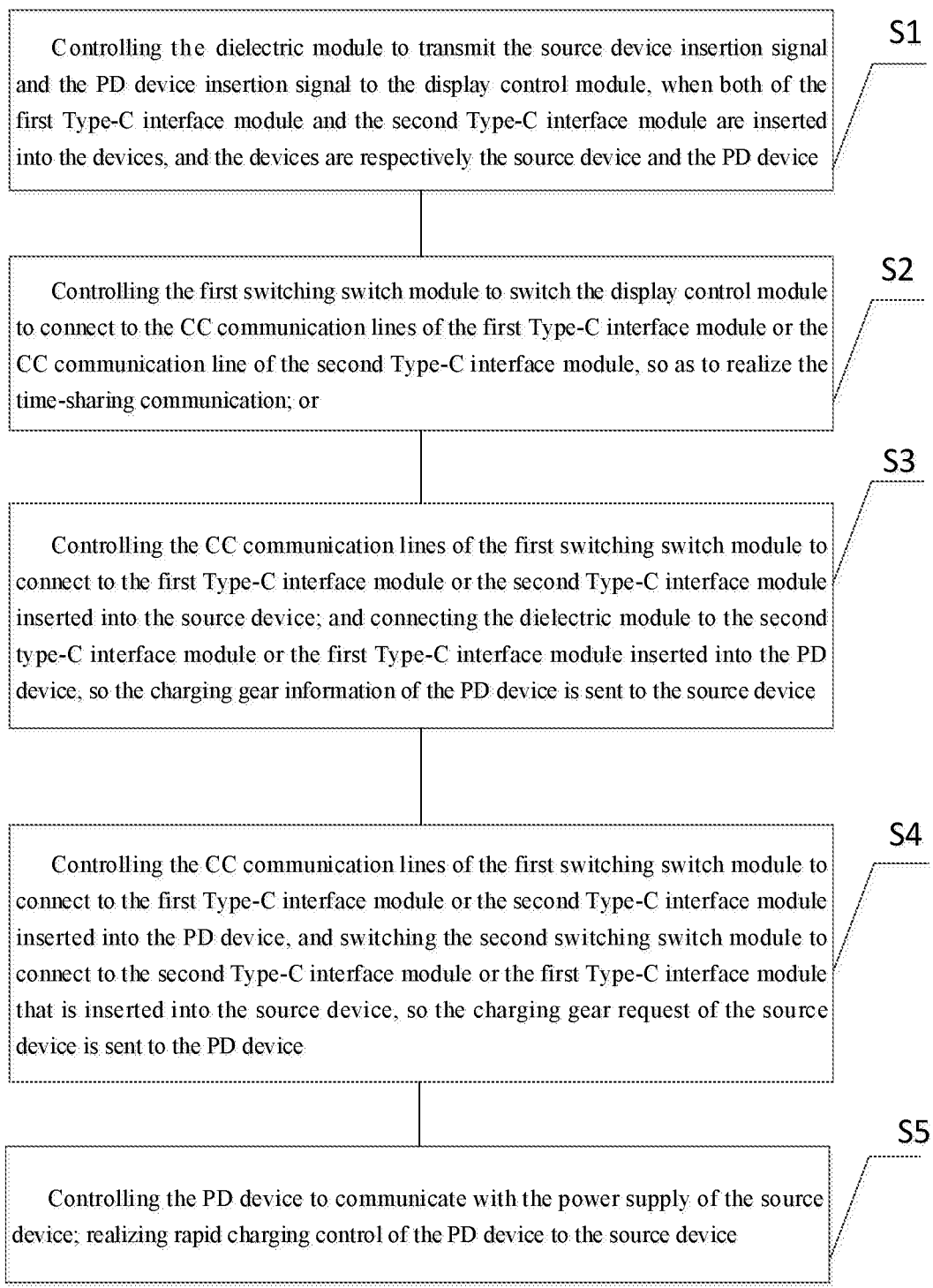
FIG. 7 is a flow chart of a control circuit of the blind-mating display having two Type-C interfaces and based on one differential pair of CCs according to one optional embodiment of the present disclosure.

As shown in FIG. 7, FIG. 7 is a flow chart of the control circuit of the blind-mating display having two Type-C interfaces and based on one differential pair of CCs of the present disclosure.

The present disclosure provides a control method of the blind-mating display having two Type-C interfaces and based on one differential pair of CCs. The control method is applied to the control circuit of the blind-mating display having two Type-C interfaces and based on one differential pair of CCs mentioned above. The control method comprises:

S1: controlling the dielectric module 6 to transmit the source device insertion signal and the PD device insertion signal to the display control module 1, when both of the first Type-C interface module 2 and the second Type-C interface module 3 are inserted into the devices, and the devices are respectively the source device and the PD device, S2: controlling the first switching switch module 4 to switch the display control module 1 to connect to the CC communication lines of the first Type-C interface module 2 or the CC communication lines of the second Type-C interface module 3, so as to realize the time-sharing communication; or S3: controlling the CC communication lines of the first switching switch module 4 to connect to the first Type-C interface module 2 or the second Type-C interface module 3 inserted into the source device; and connecting the dielectric module to the second Type-C interface module 3 or the first Type-C interface module 2 inserted into the PD device, so the charging gear information of the PD device is sent to the source device;

S4: controlling the CC communication lines of the first switching switch module 4 to connect to the first Type-C interface module 2 or the second Type-C interface module 3 inserted into the PD device, and switching the second switching switch module 5 to connect to the second Type-C interface module 3 or the first Type-C interface module 2 that is inserted into the source device, so the charging gear request of the source device is sent to the PD device; and S5: controlling the PD device to communicate with the power supply of the source device; realizing rapid charging control of the PD device to the source device.

Details of the control circuit of the blind-mating display having two Type-C interfaces and based on one differential pair of CCs of the present disclosure can be referred to above embodiments, which are not repeated herein.

It should be noted that, in the present disclosure, terms "comprise", "include" or any other variation thereof are intended to encompass non-exclusive inclusion, such that a process, method, article or device not only comprises elements explicitly listed, but also comprises elements not explicitly listed or other elements inherent to such a process, method, article or device. Without further limitation, elements defined by the statement "including a . . . " do not preclude the existence of additional identical elements in the process, method, article, or device including the elements.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A control circuit of a blind-mating display having two Type-C interfaces, comprising:
a display control module,
a first Type-C interface module,
a second Type-C interface module,
a first switching switch module,
a second switching switch module, and
a dielectric module;
wherein the dielectric module is electrically connected to the first Type-C interface module and the second Type-C interface module; the display control module is electrically connected to the dielectric module;
wherein the first switching switch module is electrically connected to the first Type-C interface module and the second Type-C interface module; the display control module is electrically connected to the first switching switch module;

wherein the second switching switch module is electrically connected to the first Type-C interface module and the second Type-C interface module; the display control module is electrically connected to the second switching switch module; the display control module is connected to a display terminal;

when both of the first Type-C interface module and the second Type-C interface module are inserted into devices, and the devices are respectively a source device and a power delivery (PD) device; the dielectric module is configured to transmit a source device insertion signal and a PD device insertion signal to the display control module;

the first switching switch module is configured to switch the display control module to connect to configuration channel (CC) communication lines of the first Type-C interface module or CC communication lines of the second Type-C interface module, so as to realize time-sharing communication between the display control module and the source device or time-sharing communication between the display control module and the PD device; or wherein the display control module is configured to control CC communication lines of the first switching switch module to connect to the first Type-C interface module or the second Type-C interface module inserted into the source device; and the display control module is configured to connect the dielectric module to the second Type-C interface module or the first Type-C interface module inserted into the PD device, so charging gear information of the PD device is sent to the source device;

wherein the display control module is configured to control the CC communication lines of the first switching switch module to connect to the first Type-C interface module or the second Type-C interface module inserted into the PD device, and the display control module is configured to switch the second switching switch module to connect to the second Type-C interface module or the first Type-C interface module inserted into the source device, so a charging gear request of the source device is sent to the PD device;

wherein the display control module is configured to control the PD device to communicate with a power supply of the source device; the display control module is configured to realize rapid charging control of the PD device to the source device.

2. The control circuit of the blind-mating display having two Type-C interfaces according to claim 1, wherein when one of the first Type-C interface module and the second Type-C interface module is inserted into the source device, the dielectric module is configured to transmit the source device insertion signal to the display control module; the display control module is configured to control the CC communication lines of the first switching switch module to connect to the first Type-C interface module or the second Type-C interface module inserted into the source device; the source device inputs a display signal source to the display control module through the first Type-C interface module or the second Type-C interface module to realize output display.

3. The control circuit of the blind-mating display having two Type-C interfaces according to claim 1, wherein when one of the first Type-C interface module and the second Type-C interface module is inserted into the PD device, the dielectric module is configured to transmit the PD device insertion signal to the display control module; the display control module is configured to control the CC communication lines of the first switching switch module to connect to the first Type-C interface module or the second Type-C interface module inserted into the PD device; the display control module performs protocol communication with the PD device through the first Type-C interface module or the second Type-C interface module to realize rapid charging control of the display terminal.

4. The control circuit of the blind-mating display having two Type-C interfaces according to claim 1, wherein the control circuit of the blind-mating display having two Type-C interfaces further comprises a USB switching module and a USB extension module;

wherein the USB switching module is electrically connected to the first Type-C interface module and the second Type-C interface module; the USB extension module is electrically connected to the USB switching module.

5. The control circuit of the blind-mating display having two Type-C interfaces according to claim 1, wherein the dielectric module comprises a first dielectric unit and a second dielectric unit;

wherein the first dielectric unit is electrically connected to the first Type-C interface module, the display control module, and a system power supply;

wherein the second dielectric unit is electrically connected to the second Type-C interface module, the display control module, and the system power supply.

6. The control circuit of the blind-mating display having two Type-C interfaces according to claim 5, wherein the first dielectric unit comprises a first positive channel metal oxide semiconductor (PMOS) transistor, a first triode, and a second triode;

wherein a gate of the first PMOS transistor is electrically connected to the display control module; a source of the first PMOS transistor is electrically connected to the system power supply; a drain of the first PMOS transistor is electrically connected to a base of the first triode, an emitter of the first triode is electrically connected to a first CC pin of the first Type-C interface module; a collector of the first triode is grounded; a base of the second triode is electrically connected to the base of the first triode; an emitter of the second triode is electrically connected to a second CC pin of the first Type-C interface module; a collector of the second triode is grounded.

7. The control circuit of the blind-mating display having two Type-C interfaces according to claim 1, wherein the first switching switch module comprises a first double-pole double-throw analog switching switch, a first resistor, and a second resistor;

wherein a first end of the first double-pole double-throw analog switching switch is electrically connected to a first end of the display control module and a first end of the first resistor; a second end of the first resistor is electrically connected to a system power supply; a second end of the first double-pole double-throw analog switching switch is electrically connected to a first CC pin of the first Type-C interface module; a third end of the first double-pole double-throw analog switching switch is electrically connected to a first CC pin of the second Type-C interface module; a fourth end of the first double-pole double-throw analog switching switch is electrically connected to the display control module;

a fifth end of the first double-pole double-throw analog switching switch is grounded; a sixth end of the first double-pole double-throw analog switching switch is electrically connected to the display control module; a seventh end of the first double-pole double-throw analog switching switch is electrically connected to a second CC pin of the second Type-C interface module; an eighth end of the first double-pole double-throw analog switching switch is electrically connected to a second CC pin of the first Type-C interface module; a ninth end of the first double-pole double-throw analog switching switch is electrically connected to the display control module and a first end of the second resistor, a second end of the second resistor is electrically connected to the system power supply; a tenth end of the first double-pole double-throw analog switching switch is electrically connected to the system power supply.

8. The control circuit of the blind-mating display having two Type-C interfaces according to claim 1, wherein the second switching switch module comprises a second double-pole double-throw analog switching switch, a third resistor, and a fourth resistor;

wherein a first end of the second double-pole double-throw analog switching switch is electrically connected to the display control module, a second end of the second double-pole double-throw analog switching switch is electrically connected to a first CC pin of the first Type-C interface module; a third end of the second double-pole double-throw analog switching switch is electrically connected to a first CC pin of the second Type-C interface module; a fourth end of the second double-pole double-throw analog switching switch is electrically connected to a first end of the third resistor; a second end of the third resistor is electrically connected to a system power supply; a fifth end of the second double-pole double-throw analog switching switch is grounded; a sixth end of the second double-pole double-throw analog switching switch is electrically connected to a first end of the fourth resistor; a second end of the fourth resistor is electrically connected to the system power supply; a seventh end of the second double-pole double-throw analog switching switch is electrically connected to a second CC pin of the second Type-C interface module; an eighth end of the second double-pole double-throw analog switching switch is electrically connected to a second CC pin of the first Type-C interface module; a ninth end of the second double-pole double-throw analog switching switch is electrically connected to the display control module; a tenth end of the second double-pole double-throw analog switching switch is electrically connected to the system power supply.

9. A control device of a blind-mating display having two Type-C interfaces, comprising the control circuit of the blind-mating display having two Type-C interfaces according to claim 1.

10. A control method of the blind-mating display having two Type-C interfaces, applied to the control circuit of the blind-mating display having two Type-C interfaces according to claim 1, comprising:

controlling the dielectric module to transmit the source device insertion signal and the PD device insertion signal to the display control module, when both of the first Type-C interface module and the second Type-C interface module are inserted into the devices, and the devices are respectively the source device and the PD device;

controlling the first switching switch module to switch the display control module to connect to the CC communication lines of the first Type-C interface module or the CC communication lines of the second Type-C interface module, so as to realize the time-sharing communication between the display control module and the source device or time-sharing communication between the display control module and the PD device; or controlling the CC communication lines of the first switching switch module to connect to the first Type-C interface module or the second Type-C interface module inserted into the source device; and connecting the dielectric module to the second Type-C interface module or the first Type-C interface module inserted into the PD device, so the charging gear information of the PD device is sent to the source device;

controlling the CC communication lines of the first switching switch module to connect to the first Type-C interface module or the second Type-C interface module inserted into the PD device, and switching the second switching switch module to connect to the second Type-C interface module or the first Type-C interface module that is inserted into the source device, so the charging gear request of the source device is sent to the PD device; and controlling the PD device to communicate with the power supply of the source device; realizing rapid charging control of the PD device to the source device.

* * * * *